US006790933B2

(12) United States Patent
Huynh et al.

(10) Patent No.: US 6,790,933 B2
(45) Date of Patent: Sep. 14, 2004

(54) LOW PROTEIN NATURAL LATEX ARTICLES

(75) Inventors: Loi Vinh Huynh, Marietta, GA (US); Mayuree Wattanayonkit, Songkhla (TH); Budsarin Rattana, Satun (TH)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 10/222,755

(22) Filed: Aug. 16, 2002

(65) Prior Publication Data

US 2004/0031086 A1 Feb. 19, 2004

(51) Int. Cl.$^7$ ................................. C08F 6/00
(52) U.S. Cl. ..................... 528/480; 524/925; 528/482; 528/488; 528/490
(58) Field of Search .................... 524/925; 528/480, 528/482, 488, 490

(56) References Cited

U.S. PATENT DOCUMENTS

| | | | |
|---|---|---|---|
| 4,152,783 A | 5/1979 | Choksi | |
| 4,499,154 A | 2/1985 | James et al. | |
| 4,519,098 A | 5/1985 | Dunmire et al. | |
| 4,575,476 A | 3/1986 | Podell et al. | |

(List continued on next page.)

FOREIGN PATENT DOCUMENTS

| | | |
|---|---|---|
| EP | 0574160 A1 | 12/1993 |
| EP | 0640623 A2 | 3/1995 |
| EP | 0704457 A1 | 4/1996 |
| WO | WO 9625278 A1 | 8/1996 |
| WO | WO 0220648 A1 | 3/2002 |

OTHER PUBLICATIONS

ASTM Designation D 6499–00, "Standard Test Method for The Immunological Measurement of Antigenic Protein in Natural Rubber and its Products," pp. 1–6.
ASTM Designation D 5712–99, "Standard Test Method for The Analysis of Aqueous Extractable Protein in Natural Rubber and Its Products Using the Modified Lowry Method," pp. 1–7.

*Primary Examiner*—Terressa Boykin
(74) *Attorney, Agent, or Firm*—Dority & Manning, P.A.

(57) ABSTRACT

The present invention is directed to a process for producing a powder free natural latex article and the articles produced by the process. In one embodiment, the process of the present invention may be used to form a powder free natural latex glove which has very low levels of extractable protein without being subjected to a halogenation processes. The process includes forming a natural rubber article on a former and then, either before or after stripping the article from the former, contacting the article with a rinse solution comprising the ionic species of a disassociated metal salt. In one embodiment, the metal salt may be sodium chloride. Contact with the rinse solution may lower protein levels in the latex. When the article is stripped from the former prior to contact with the rinse solution, the rinse solution may also remove any residual powders from the glove in order to produce a powder free natural rubber article. The non-chlorinated product may have good gripping characteristics and an extended shelf life when compared to similar chlorinated products.

10 Claims, 2 Drawing Sheets

U.S. PATENT DOCUMENTS

| | | |
|---|---|---|
| 4,597,108 A | 7/1986 | Momose |
| 4,853,978 A | 8/1989 | Stockum |
| 5,088,125 A | 2/1992 | Ansell et al. |
| 5,121,962 A | 6/1992 | Weber et al. |
| 5,133,090 A | 7/1992 | Modak et al. |
| 5,196,799 A | 3/1993 | Beard et al. |
| 5,272,771 A | 12/1993 | Ansell et al. |
| 5,284,157 A | 2/1994 | Miller et al. |
| 5,284,607 A | 2/1994 | Chen |
| 5,326,515 A | 7/1994 | Sakaki et al. |
| 5,335,373 A | 8/1994 | Dangman et al. |
| 5,357,636 A | 10/1994 | Dresdner, Jr. et al. |
| 5,370,900 A | 12/1994 | Chen |
| 5,459,880 A | 10/1995 | Sakaki et al. |
| 5,545,451 A | 8/1996 | Haung et al. |
| 5,563,241 A * | 10/1996 | Beezhold .................... 528/482 |
| 5,601,870 A | 2/1997 | Haung et al. |
| 5,612,083 A | 3/1997 | Haung et al. |
| 5,780,112 A | 7/1998 | Pugh et al. |
| 5,974,589 A | 11/1999 | Pugh et al. |
| 6,019,922 A | 2/2000 | Hassan et al. |
| 6,051,320 A | 4/2000 | Noecker et al. |
| 6,054,525 A | 4/2000 | Schloman, Jr. et al. |
| 6,107,455 A * | 8/2000 | Rosholm et al. ............ 528/488 |
| 6,345,394 B1 | 2/2002 | Nakamura et al. |
| 6,378,137 B1 | 4/2002 | Hassan et al. |
| 2003/0040599 A1 * | 2/2003 | Mukherjee et al. ......... 528/480 |

* cited by examiner

LOW PROTEIN NATURAL LATEX ARTICLES

BACKGROUND OF THE INVENTION

Elastomeric articles formed from natural latex emulsions have been used in the past in many different applications including surgeons gloves, examining gloves, prophylactics, catheters, balloons, tubing, and the like. Natural rubber latex has been useful in the production of such articles in part because of its physical properties upon curing. For example, the articles may exhibit very elastic properties. The articles formed not only may be stretched many times their length, but are also capable of substantially returning to their original shape when released.

One problem encountered with natural rubber articles in the past is that the natural latex may contain proteins which cause reactions, such as allergic reactions, in consumers who come into contact with the materials. In response, industry and governmental standards have been set requiring the level of protein remaining in the latex after production to be quite low, generally less than 50 micrograms/gram ($\mu g/g$), and levels of antigenic protein below about 10 micrograms/square decimeter ($\mu g/dm^2$). Methods have been developed to meet these standards, including rather complicated chlorination processes involving the use of chlorine gas or liquid such as sodium hypochlorite. These processes present their own difficulties, however, including high associated costs and difficulties in dealing with the corrosive materials. As such, a relatively inexpensive, safe method for reducing the amount of protein in natural latex articles is needed.

Traditionally, natural latex articles have been manufactured through the use of a mold or former in the shape of the article to be produced. For example, when manufacturing a glove, a hand-shaped mold or former is first dipped in a coagulant. After the coagulant has dried on the former, the former is dipped in a natural latex such that a coating is coagulated on the former. The latex is then cured and the formed natural rubber article may be stripped from the mold, which may also invert the glove. In some cases, the former may be dipped into a slurry prior to stripping, in order to prevent blocking of the film upon stripping.

Elastomeric articles are typically tacky to the touch when initially manufactured. Tackiness at the surface of the article may increase the difficulty in stripping the product from the mold during manufacture. Historically, the most common process for decreasing tackiness of the glove has been the addition of a powder such as calcium carbonate to the coagulant used when forming the glove and to the pre-strip slurry. The powder acts as a buffer or barrier between the surfaces to help in preventing the film from adhering to the former during the curing process or to help in preventing the film from blocking to itself. A certain amount of this powder, however, may remain on the surface of the glove after it has been stripped from the former. While powder on the glove surface is acceptable for some applications, powders may not be desired in certain applications, such as surgical or other clean-room type applications.

As a result, post-stripping powder-removal processing techniques have been developed. For example chemical surface treatments such as chlorination have been developed in order to eliminate powders on the product after it has been stripped from the former. However, these powder-removal techniques tend to not only be expensive, but may also reduce the shelf life of the treated elastomeric article.

Another problem experienced with elastomeric articles which have been subjected to chlorination processes is that the outer gripping surfaces may become too slippery, and the wearer may find it more difficult to grasp objects in the gloved hand without losing the grip. This problem is particularly troublesome for gloves treated by powder-free processing techniques such as halogenation, because the very processing which removes the powder used to reduce tackiness on the surface of the glove may also react with the natural latex and promote excessive loss of gripping ability.

Thus, a need also exists for a method of producing a powder-free natural latex article which may be easily stripped from the forming mold and maintains good gripping characteristics.

SUMMARY OF THE INVENTION

In one embodiment, the process of the present invention is directed to a method for reducing the amount of extractable protein in a natural latex article. More specifically, the process of the present invention includes contacting a natural latex article with a solution comprising the ionic species of a disassociated metal salt. For example, a natural latex article, such as a glove, may be contacted with an aqueous rinse solution comprising the ionic species of sodium chloride for a sufficient amount of time such that the amount of extractable protein in the article is lowered to less than about 50 $\mu g/g$. In one embodiment, a natural latex article may be contacted with a sodium chloride rinse solution.

In an alternative embodiment, the process of the present invention is directed to a process for producing a natural latex article, for example a glove. In this embodiment, the process may include contacting a former with a coagulant composition, and then contacting the former with a natural latex emulsion. The natural latex then coalesces on the former, and it may then be cured to form the article. After the latex is cured, the article may be immersed in the rinse solution of the present invention for a long enough period of time to cause the protein levels in the article to drop to acceptable levels. For example, extractable protein levels may be lowered to less than about 45 $\mu g/g$ through the process of the present invention.

Any metal salt which will not react with the polymer matrix forming the latex film may be used to form the rinse solution. For example, any Group I or Group II metal salt which will not react with the polymer matrix forming the latex film may be used. If desired more than one salt may be combined together in forming the solution.

In one embodiment, a powder may be added to the coagulant or to a pre-strip slurry, for ease in stripping the article from the former. For example, a calcium carbonate powder may be included in the coagulant and the slurry.

The natural latex article may be a powder free article, even when a powdered coagulant is employed, because the rinse solution may not only lower protein levels in the article, but may also remove residual powders, such as calcium carbonate powder, from the article.

A natural latex glove produced by the process of the present invention may have protein levels below about 45 $\mu g/g$, antigenic protein levels below about 5 $\mu g/dm^2$, residual calcium carbonate levels of less than about 0.04 mg, and need not be subjected to a chlorination process. As such, the exposed natural rubber on the article will not be too slippery and may therefore provide a good gripping surface on the article.

BRIEF DESCRIPTION OF THE DRAWINGS

A full and enabling disclosure of the present invention, including the best mode thereof to one of ordinary skill in the art, is set forth more particularly in the remainder of the specification, including reference to the accompanying figures in which.

DETAILED DESCRIPTION OF THE INVENTION

It is to be understood by one of ordinary skill in the art that the present discussion is a description of exemplary embodiments only, and is not intended as limiting the broader aspects of the present invention, which broader aspects are embodied in the exemplary construction. Moreover, it should be further understood, that even though the natural latex articles referred to in the remainder of this description are generally referred to as gloves, the present invention is applicable to other natural latex articles as well, and is not to be limited to gloves.

The present invention is generally directed to the production of natural latex articles having low residual protein and good gripping characteristics. More specifically, the natural latex articles formed by the processes of the present invention may be low protein, powder-free natural latex articles which may be easily stripped from the forming molds and not require halogenation surface treatments.

In general, the method of the present invention is directed to a process in which a former or mold is used to form a natural latex article. For example, the former may be a hand-shaped former and may be used to form a natural rubber latex glove. In forming the glove, the former may be dipped into a coagulant. For example, either a powder-free coagulant or a coagulant which includes a powder may be used. A powdered coagulant may include any suitable powder, such as a calcium carbonate powder or a starch, which may aid in stripping the article from the former. After the coagulant has been applied and dried on the former, the former may be contacted with a natural latex emulsion which may coagulate on the former and form the primary matrix of the glove.

After the latex film is cured and either before or after stripping the glove from the former, the latex article may be immersed in or otherwise contacted with a rinse solution comprising the ionic species of a disassociated metal salt for a period of time. In one embodiment, the rinse solution may be a sodium chloride solution. Contact between the natural latex and the rinse solution may extract protein from the natural latex without causing undesired reactions with the latex polymer matrix. In addition, in the case of a post-stripping rinse, the rinse solution may clean any residual powder from the glove in order to produce a powder free glove. The process of the present invention may remove protein and powders from the glove without affecting the grip characteristics of the glove, because, unlike halogenation processes known in the past, the present process may remove undesired compounds without reacting with the polymer matrix of the article, which has been known to cause the glove surface to become too slippery.

Figure 1:
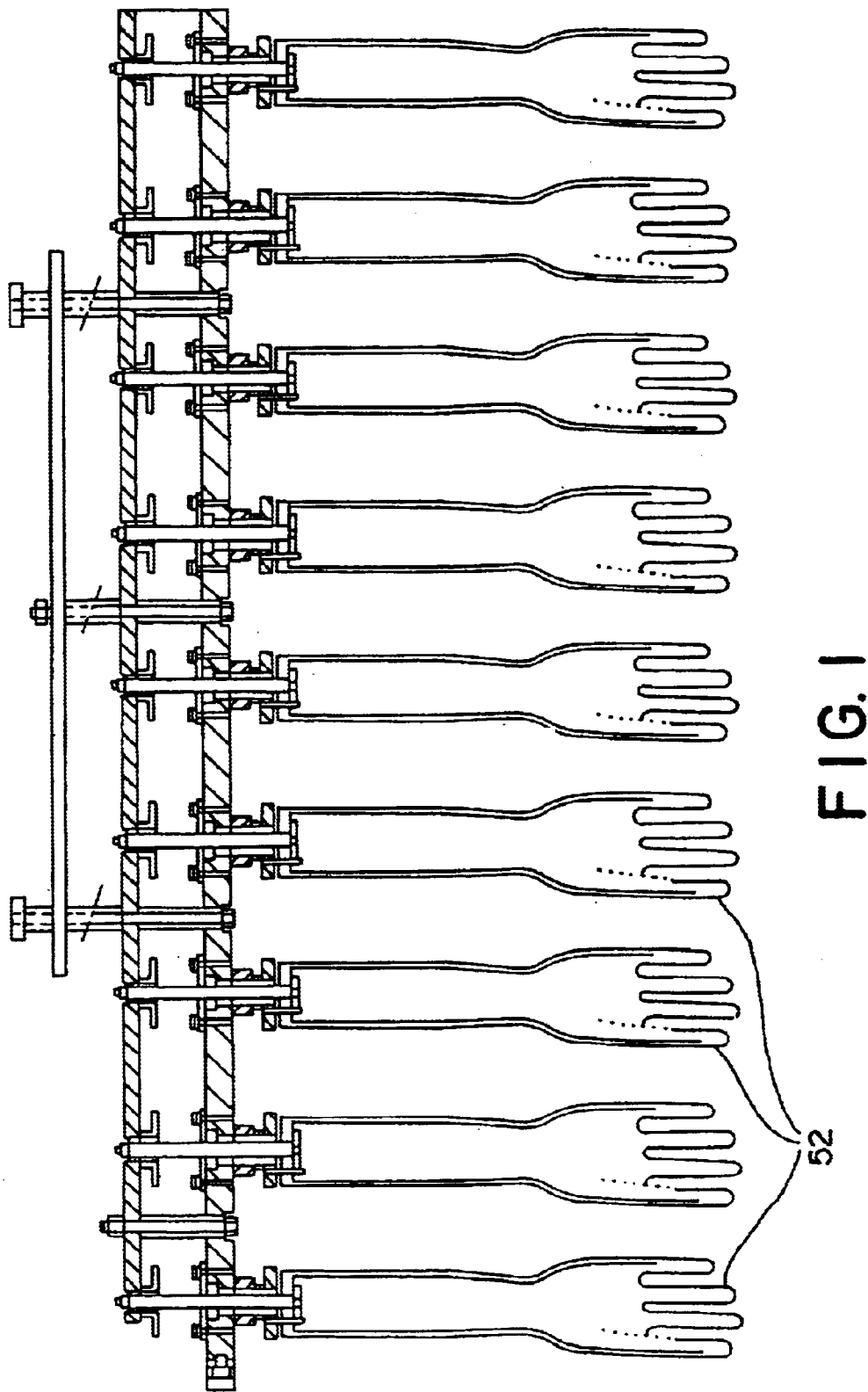
FIG. 1 is an illustration of glove-shaped formers that may be used in accordance with one embodiment of the present invention.

FIG. 1 is an illustration of a series of glove molds or formers 52 which may be used to form the natural latex gloves of the present invention. The formers 52 shown in FIG. 1 are illustrated on a pallet as is conventionally used in a batch processing operation, but it should be understood that the process of the present invention may equally be utilized in a continuous operation. A former 52 may generally be a contoured mold having a textured or smooth surface which may accept a series of coatings and release the formed glove. Possible materials for the surface of former 52 may include any suitable surface material. For example, the surface of former 52 may be formed of ceramic, porcelain, glass, metal, or certain fluorocarbons.

If desired, a former 52 may be cleaned prior to formation of a glove on the former. The cleaning process may generally include an optional water pre-rinse followed by an acid wash. After the acid wash, the former 52 may be rinsed with water and dipped in a heated caustic solution prior to a final water rinse. After the optional cleaning process, a glove may be formed on the former 52 through a series of dipping and drying steps.

Figure 2:
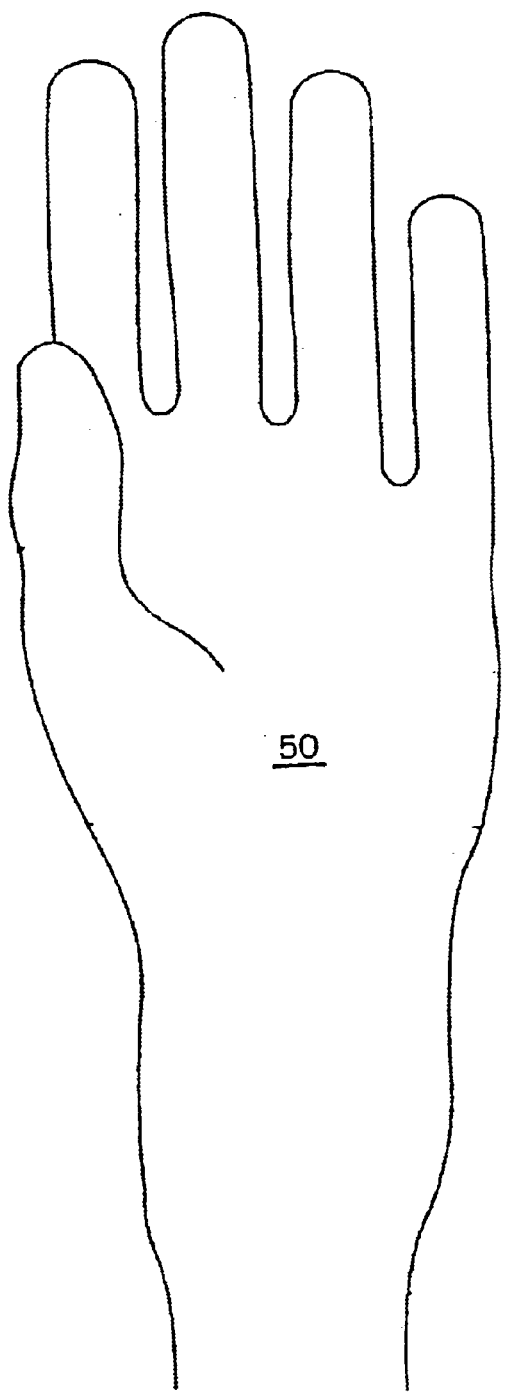
FIG. 2 is a front view of a glove which may be produced according to the present invention.

FIG. 2 illustrates one possible embodiment of a glove 50 which may be formed on former 52. The glove 50 may be powder-free and still be easily stripped from the former and have good tactile characteristics. In one embodiment, the glove 50 may be formed through a series of dippings or immersions of the former 52. For example, in one embodiment, after cleaning, the former 52 may be dipped into a coagulant composition.

In general, a coagulant causes the base polymer which will form the body of the glove to coagulate and polymerize. Coagulants that may be used in the present invention may include powders, to ease stripping of the glove from the former, or, if desired may be powder free coagulant compositions. In one embodiment, a powder free coagulant composition may be used which includes water soluble salts of calcium, zinc, aluminum, and the like. For example, in one embodiment, calcium nitrate in water or alcohol may be used in the coagulant composition. In such an embodiment, calcium nitrate may be present in the solution in an amount of up to about 40% by weight. Optionally, the coagulant composition may also contain additives such as surfactants.

In one embodiment, the coagulant composition may include the following:

| | |
|---|---|
| Calcium nitrate (77%) | 18.75 wt % |
| Calcium carbonate | 5.6 wt % |
| SURFYNOL TG (non-ionic surfactant) | 0.15 wt % |
| Teric 320 (10%) (non-ionic surfactant) | 1.37 wt % |
| SURFONYL DF 37 (non-ionic surfactant) | 0.005 wt % |
| Water | remainder |

After being immersed in the coagulant composition, the former 52 may be withdrawn and the coagulant present on the surface of the former may be allowed to dry. For many applications, the coagulant may be air dried for a time of from about one minute to about two minutes. Once dried, a residual coating of the coagulant is left on the former.

If desired, the coagulant composition may optionally contain certain additives. For example, the coagulant composition may contain various additives which may improve the tactile characteristics of a surface of the glove.

After the coagulant dip, the former may be immersed or dipped into a natural latex emulsion. In general, the latex emulsion of the present invention may have a dry rubber content (DRC) of less than about 50% or alternatively a total solid content (TSC) of less than about 50%. In one embodiment, the latex emulsion may have a DRC or a TSC content of less than about 25%. The latex emulsion may also contain various additives such as pH adjustors, stabilizers, and the like as are generally known in the art.

Upon contact of the latex with the coagulant composition, the coagulant may cause some of the natural latex to become locally unstable and coagulate on the surface of the former. Thus, the coagulant itself does not form a separate layer of the final glove, but rather becomes a part of the film forming the primary matrix of the glove. Any additives in the coagulant composition may, depending upon what they are, form a layer between the former and the latex film, or alternatively may be incorporated into the latex film and may subsequently be leached out during a leaching process. After the desired amount of time, the former 52 is withdrawn from the latex emulsion, and the coagulated layer is allowed to coalesce fully on the former.

The amount of time the former 52 is immersed (commonly termed as dwell time) in the natural latex emulsion determines the thickness of the film. Increasing the dwell time of the former in the latex causes the thickness of the film to increase. The total thickness of the film forming the glove body may depend on other parameters as well, including, for example, the solids content of the latex emulsion and the additive content of the latex emulsion and/or the coagulant composition.

After being dipped into the latex emulsion, the former may then be heated to cure the polymer. If desired, the former may be dipped multiple times into the latex in order to increase the thickness of the glove.

Various pre-vulcanizing processing techniques are generally known in the art and may be incorporated into the present process. For example, the latex emulsion layer may be gelled with heat to strengthen the elastomeric rubber film. If desired, the latex layer may be leached with flowing hot water. A leaching process may extract various undesired emulsion constituents from the coalesced latex. This may cause the latex emulsion to shrink somewhat on the former and remove impurities from the coalesced emulsion.

Another possible process prior to vulcanizing the primary matrix of the glove may involve the formation of additional layers on the primary matrix and is generally termed an over-dip process. This is generally done by immersing the former into an emulsion of the desired polymer. Additional layers on the primary matrix may, for instance, form donning or gripping layers on the glove. For example, in one embodiment of the present invention, a hydrogel polymer coating may be formed on the glove. In this embodiment, the glove may be primed by dipping into a solution containing ACTIVE BOND, which is an acidic polymer available by Delta Polymer Systems. After the ACTIVE BOND polymer is dried, the glove is dipped into a hydrogel polymer solution containing BYOSYLK product, which is also available from Delta Polymer Systems and may include BYOSYLK, BYOSYLK Part A, and BYOSYLK Part B, which are mixed with water and phosphoric acid in forming the dipping composition. After the hydrogel coating is applied to the glove, the glove may enter a beading station and be placed in an oven where the hydrogel polymer is cured and the natural rubber latex is vulcanized.

Another example of a possible donning layer which may be formed on the gloves of the present invention may be a polybutadiene based donning layer, for example a donning layer including 1,2 polybutadiene (e.g., syndiotactic 1,2 polybutadiene). In one embodiment, such a donning layer may be formed from a solution that contains 5.0 weight % Presto Emulsion (15% solids), 2.0 weight % magnesium carbonate, 3.0 weight % compounded natural rubber latex, and 90.0 weight % deionized water. The "Presto Emulsion" is manufactured by Ortec, Inc. of Easley, S.C. and is an emulsion of 1,2 syndiotactic polybutadiene in toluene and water.

It should be understood that any desired additional layers may be formed onto the primary matrix of the glove of the present invention, and not only the layers which have been discussed above. For example, formation of one or more layers as is generally known in the art may be included in the process of the present invention, such as, for example, layers formed of polyurethanes, silicones, acrylics, other polybutadienes, and the like.

After formation of the primary matrix, the natural latex layer coalesced on the former may be vulcanized to form the natural rubber film. In general, the latex is vulcanized by high temperature reaction with a vulcanizing agent, generally sulfur, to cause cross-linking of the polymer chains. Vulcanizing may generally take place at temperatures of between about 200° F. and about 300° F. In addition to vulcanizing the latex, the high temperature process may cause the evaporation of any volatile components remaining on the former, including water remaining from the emulsion dip. Therefore, the vulcanizing process may cause shrinkage in the film and the thickness of the final rubber film may generally be less than the thickness of the latex emulsion which was coalesced on the former. In general, the thickness of a glove wall formed by the processes of the present invention may be from about 3 mil to about 15 mil. In some embodiments, the thickness of a glove wall may be from about 3 mil to about 5.5 mil.

After the primary matrix of the glove has been formed, the process of the present invention includes contacting the glove with a rinse solution. The rinse of the present invention may occur at any point in the process following the formation of the primary matrix. For instance, the former may be contacted with the rinse solution after the formation of the primary matrix and prior to the formation of subsequent layers, such as gripping or donning layers on the glove. Alternatively, the glove may be contacted with the rinse solution while still on the former, but after other desired processing steps have been completed. For instance, a donning or gripping layer may be formed on a portion of the glove surface, final vulcanizing may be completed, and then the glove may be contacted with the rinse solution prior to stripping the glove from the former. Protein extraction may occur where the exposed latex, i.e., the latex not coated with a donning or gripping layer, contacts the rinse solution.

In one embodiment, the glove may be contacted with the rinse solution after being stripped from the former. For example, the glove may be tumbled in a bath comprising the rinse solution after the glove has been stripped from the former and prior to packaging. In such an embodiment, protein extraction may occur at exposed latex surfaces on both the donning side and gripping side of the glove during the rinse.

In general, the rinse solution of the present invention may be an aqueous solution which includes the ionic species of at least one disassociated salt, for instance a disassociated metal salt. The metal salt in the rinse solution of the present invention will not react with the latex polymer of the glove. That is, the metal salt will not cause a change in the latex polymer matrix at the glove surface, as do halogenation processes known in the past.

For purposes of this disclosure, a salt is defined as the reaction product when a metal displaces the hydrogen of an acid. The metal salt which may be used in the rinse solution of the present invention may be any Group I or Group II metal salt, or any combination thereof which will not react with the latex polymer matrix forming the glove film. For example, the rinse solution may be an aqueous solution of sodium chloride, potassium chloride, calcium chloride, or the like. In one embodiment, the rinse solution may include disassociated sodium phosphate tribasic.

The concentration of the metal salt which is dissolved in the rinse solution may be at any level, up to the saturation point of the solution. In general, the higher the concentration of the solution, the more efficient the protein extraction from the latex will be. In one embodiment, the solution may be from about 0.1 to about 10 wt % salt. More specifically, the solution may be from about 0.1 to about 1.5 wt % salt.

Though not wishing to be bound by any theory, it is believed that the presence of the ionic species in the rinse solution may produce an abrasive scrubbing action on the surface of the latex film, physically loosening large protein molecules from the film. In addition, the charged species in solution may form coordinated complexes with the charged chains on the proteins. The coordinated complex may then serve to extract the protein from the latex matrix and into the aqueous rinse solution. As such, if desired, the rinse solution may be prepared to target specific protein species in the latex, depending on their charge content. For example, a low pH rinse solution may be developed to target negatively charged proteins, and an alkaline solution may be prepared to target protein chains having a large amount of positive charge. In general, however, it is not necessary to include any pH adjusting additives in the rinse solution. For example, the rinse solution may contain only water and the desired metal salt in order to lower total protein levels, and particularly antigenic protein levels, down to desired levels.

Through the process of the present invention, extractable protein levels may be lowered in a natural latex article to less than about 50 $\mu$g/g, the highest limit currently desired in the industry. In certain embodiments, protein levels in natural latex articles formed by the processes of the present invention may be less than about 45 $\mu$g/g. In some embodiments, protein levels are less than about 42 $\mu$g/g. Concordantly, antigenic protein levels may also be lowered below required levels through the process of the present invention. For instance, natural latex articles formed by the processes of the present invention may have antigenic protein levels below about 10 $\mu$g/dm$^2$. In some embodiments, the antigenic protein levels may be below about 5 $\mu$g/dm$^2$. In other embodiments, the antigenic protein level may be below about 0.6 $\mu$g/dm$^2$.

Though additives to the aqueous rinse solution of the present invention are not necessary, neither are they precluded by the process. For instance, other additives, such as dyes and the like, which will not interfere with the present process may be included in the rinse solution.

The temperature of the rinse solution may be anywhere between ambient and boiling, though the process may be more efficient at higher temperatures. For example, in one embodiment, stripped gloves may be rinsed in a solution which is between about 70° C. and about 80° C. for a period of time between about 5 and 10 minutes in order to lower residual protein to the desired levels. Lower temperatures are possible, but may require a longer rinse period to obtain desired protein levels.

Unlike gloves produced using halogenation processes known in the past, the gloves of the present invention may be powder free, maintain good gripping characteristics on the exposed natural rubber latex surfaces, and have low protein levels in the latex. In addition, the gloves of the present invention may have a longer shelf life than halogenated gloves. Halogenation processes react with the polymer matrix forming the latex film, and may encourage the saturation of the polymer forming the glove matrix, which may not only cause the glove surface to become too slippery for good gripping, but also may cause the glove to be more prone to oxidation, and hence reduce the shelf life of the glove due to oxidative discoloration. The rinse solution of the present invention may include metal salts which will not cause saturation through reaction with the polymer matrix, and therefore the gloves of the present invention may display improved grip characteristics over powder free gloves which have been chlorinated, and will also resist discoloration over time due to oxidation.

In one embodiment, the process of the present invention may be combined with a halogenation process to further reduce protein levels in the glove or to tailor grip characteristics of the glove. In this particular embodiment, after the glove has been rinsed in the rinse solution, and while residual salt remains as a loose coating on the glove, the glove may be halogenated prior to any final water rinses. The salt coating may protect the polymer matrix of the glove from excessive saturation during halogenation while not interfering with the removal of additional protein from the latex by the chlorination process. Thus, the glove surface may lose some of the natural tackiness without becoming excessively slippery, and may have very low protein levels.

One or more water rinses of the glove following contact with the rinse solution of the present invention may remove any undesired compounds remaining on the surface of the glove. In one embodiment, the glove may be rinsed in a soft water rinse followed by a deionized water rinse to ensure limited bioburden on the gloves.

After rinsing, the glove may be lubricated on the donning side, if desired, such as with a known glove lubricant such as SM2140 which is a polydimethylsiloxane emulsion available from the General Electric Corporation. Lubrication of the donning side of the glove may be desired in order to enhance the damp donnability of the glove. The glove may then be dried prior to packaging. For instance, the glove may be dried a first time for between about 30 minutes and about 60 minutes at 50° C. to 60° C., and then dried a final time for about 60 minutes at about 70° C. to 80° C.

The processes and products of the present invention may be better understood by way of an example, which is set forth below.

EXAMPLE

Identical natural latex gloves were prepared according to standard procedures. After being stripped from the formers, two samples of the gloves were then further processed, as follows:

Sample #1

The gloves were rinsed with soft water for 10 minutes. The gloves were then chlorinated at 685 ppm for 15 minutes and neutralized for 15 minutes. The gloves were then rinsed in water four times, each rinse lasting six minutes. The gloves were then dried for 10 minutes, inverted, and dried for an additional 10 minutes.

Sample #2

The gloves were rinsed with a 1% sodium chloride solution for 10 minutes. The gloves were then chlorinated at 720 ppm for 15 minutes and neutralized for 15 minutes. The gloves were then rinsed in water four times, each rinse lasting six minutes. The gloves were then dried for 10 minutes, inverted, and dried for an additional 10 minutes.

Gloves from each of the samples were then analyzed for protein content. This analysis was performed using the Guthrie LEAP Latex ELISA (enzyme-linked immunosorbent assay) for antigenic proteins as taught by the Guthrie Research Institute of Sayre, Pa. This assay generally measures protein content based on protein reaction with antibodies that were induced by the introduction of proteins into laboratory animals; in other words, the assay measures specific antigen-antibody reactions.

Current industry recommendations include extractable protein levels below 50 $\mu$g/g or 50 $\mu$g/dm$^2$ and antigenic protein levels below 10 $\mu$g/dm$^2$. The results were as follows:

| | |
|---|---|
| Sample #1: | 1.0 $\mu$g/dm$^2$ |
| | 1.2 $\mu$g/dm$^2$ |
| Sample #2: | 0.8 $\mu$g/dm$^2$ |
| | 0.7 $\mu$g/dm$^2$ |

As may be seen, the process of the present invention may increase the efficiency of the protein extraction, and may produce natural latex gloves with antigenic protein levels well below that which is desired in the industry.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A process for reducing the amount of extractable protein in a natural latex article comprising:
    providing a natural latex article comprising a latex polymer matrix, said latex article comprising at least an inside surface and an outside surface; and
    contacting the inside surface and the outside surface of said natural latex article with a rinse solution, the rinse solution comprising the ionic species of a disassociated metal salt which does not react with the latex polymer matrix, the disassociated metal salt consisting essentially of sodium chloride, potassium chloride, calcium chloride, sodium phosphate tribasic, or mixtures thereof, the natural latex article being contacted with the rinse solution for a period of time sufficient to lower the extractable protein level in the natural latex article to a value less than about 45 $\mu$g/g.

2. The process of claim 1, wherein the metal salt consists essentially of sodium chloride.

3. The process of claim 1, wherein the rinse solution is an aqueous solution.

4. The process of claim 1, wherein the rinse solution is contacted with the article when the rinse solution is at a temperature of between about 70° C. and about 80° C.

5. The process of claim 1, wherein the rinse solution comprises between about 0.1% and about 10% by weight metal salt.

6. The process of claim 1, wherein the rinse solution comprises between about 0.1% and about 1.5% by weight metal salt.

7. The process of claim 1, wherein the natural latex article is a glove.

8. The process of claim 1, wherein the extractable protein level in the natural latex article is lowered to a value less than about 42 $\mu$g/g.

9. The process of claim 1, wherein the antigenic protein level in the natural latex article is lowered to a value less than about 5 $\mu$g/dm$^2$.

10. The process of claim 1, wherein the antigenic protein level in the natural latex article is lowered to a value less than about 0.6 $\mu$g/dm$^2$.

* * * * *

UNITED STATES PATENT AND TRADEMARK OFFICE
CERTIFICATE OF CORRECTION

PATENT NO. : 6,790,933 B2
DATED : September 14, 2004
INVENTOR(S) : KC Nguyen et al.

It is certified that error appears in the above-identified patent and that said Letters Patent is hereby corrected as shown below:

Title page,
Item [75], Inventors, should read:
-- KC Nguyen, Neenah, WI (US); Loi Vinh Huynh, Marietta, GA (US); Mayuree Wattanayonkit, Songkhla (TH); Budsarin Rattana, Satun (TH) --.

Signed and Sealed this

Twenty-eighth Day of February, 2006

JON W. DUDAS
*Director of the United States Patent and Trademark Office*